UNITED STATES PATENT OFFICE.

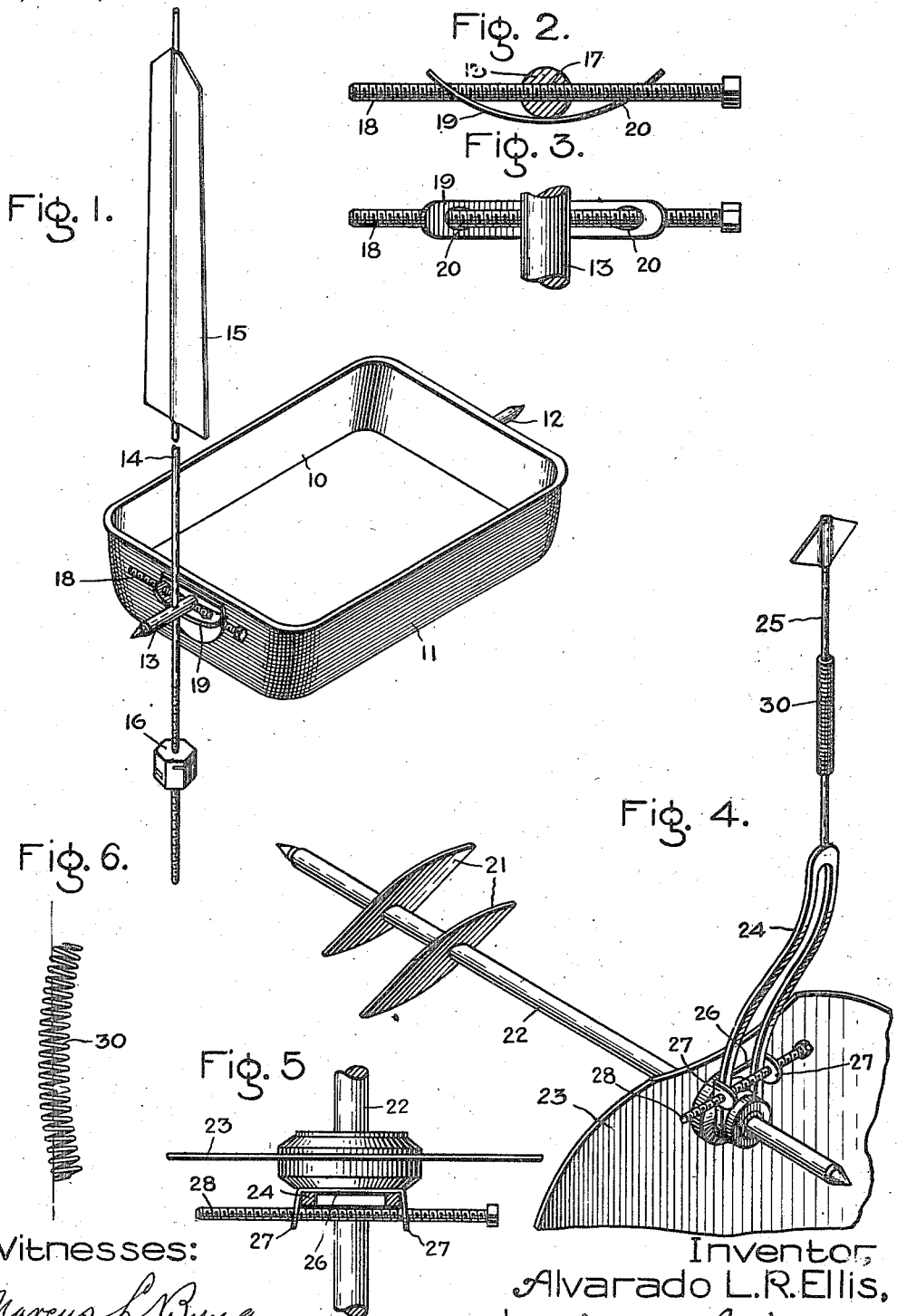

ALVARADO L. R. ELLIS, OF LYNN, MASSACHUSETTS, ASSIGNOR TO GENERAL ELECTRIC COMPANY, A CORPORATION OF NEW YORK.

ELECTRICAL MEASURING INSTRUMENT.

1,154,979. Specification of Letters Patent. Patented Sept. 28, 1915.

Application filed October 1, 1914. Serial No. 864,368.

*To all whom it may concern:*

Be it known that I, ALVARADO L. R. ELLIS, a citizen of the United States, residing at Lynn, in the county of Essex, State of Massachusetts, have invented certain new and useful Improvements in Electrical Measuring Instruments, of which the following is a specification.

My invention relates to electrical measuring instruments, and particularly to counterbalancing devices for such instruments.

The object of my invention is to provide a novel and improved counterbalancing means for the moving element of an electrical measuring instrument.

More specifically the object of my invention is to provide a novel and improved means for properly securing the side or cross-balancing arm to the moving element of such an instrument, and further to provide a novel form of counterweight for the moving element of such an instrument.

The principal aim of my present invention is to provide in an electrical measuring instrument counter-balancing means of simple and inexpensive construction, and further counter-balancing devices which may be readily and conveniently adjusted and which will securely remain in the desired adjusted positions.

The novel features of my invention which I believe to be patentable and for which I desire to secure Letters Patent are definitely indicated in the claims appended hereto. The principle of my invention and its application to the moving element of electrical measuring instruments will be understood from the following description taken in connection with the accompanying drawings, in which:

Figure 1 is an enlarged perspective view of the moving element of an electrical measuring instrument of the D'Arsonval type embodying my present invention; Figs. 2 and 3 are detail views showing on an enlarged scale the construction of the side balancing device of my invention; Fig. 4 is an enlarged perspective view of the moving element of an electrical measuring instrument of the inclined coil type embodying my invention; Fig. 5 is a detail view showing the construction of the side balancing arm of the moving element of Fig. 4; and Fig. 6 is a view of my novel helical spring counterbalance weight in its normal unrestrained condition.

The moving element of an electrical measuring instrument usually has two counterbalancing devices, a side or cross balancing arm to counterbalance inequalities in the symmetry of each side of the moving element, and a counterbalancing device such as a counterweight to counterbalance for the pointer, damping, or other analogous member of the moving element. In accordance with my present invention, the side balancing arm is firmly secured to the moving element by a simple spring member in such a manner that the arm may be released for convenient adjustment by a simple movement of the spring member. The other counterbalance device or counterweight of the moving element comprises a helical spring whose convolutions lie along an arcual line when the spring is in its normal unrestrained condition.

My invention will be best understood by reference to the accompanying drawings.

Fig. 1 of the drawings shows the moving element of an electrical measuring instrument of the D'Arsonval type. This moving element comprises a frame member 10 upon which is wound a coil of wire 11. Pivot shafts or pins 12 and 13 are secured to the frame member 10, and serve to pivotally mount the moving element in the jewels or other bearings of the instrument in the well understood manner. A pointer member or shaft 14 extends through the shaft 13 and is rigidly secured thereto. An indicating vane 15 of a well known design is secured to one end of the member 14, while the other end of the member is screw-threaded and carries a counterbalancing device or counterweight 16. This counterweight 16 is in the form of a check or lock-nut having two symmetrically positioned slots or saw cuts.

The shaft 13 has a hole 17 through which a screw-threaded side balancing arm 18 extends. The hole 17 is preferably not screw-threaded and is of slightly greater diameter than the diameter of the arm 18, so that the arm may be easily moved through the hole. A leaf or flat spring member 19 having two apertures 20 through which the arm 18 extends is positioned adjacent the shaft 13. The apertures 20 are of greater diameter than the diameter of the arm 18 and are positioned near the ends of the spring 19. Reference to Figs. 2 and 3 of the drawings will assist in understanding the function and operation of the spring 19. The central portion of the spring bears against the shaft 13 and the two ends of the spring tend to move so that the registering diameters of the two apertures become smaller. Thus, the resilient tendency of the spring is to firmly hold the counter-balancing arm 18 in position. By forcing the extremities of the spring together the registering diameters of the apertures 20 become larger until the arm 18 can be freely moved through these apertures and through the hole 17. While the extremities of the spring are thus held forced toward one another, the position of the arm 18 may be suitably adjusted, and when the extremities of the spring are released they will move away from one another and the arm will be securely held in the apertures 20 and to the shaft 13.

Figs. 4 and 5 of the drawings show the moving element of an electrical measuring instrument of the inclined coil type. Vanes 21 of the usual type are secured to a movable shaft 22. The shaft carries a damping disk 23 of a well known design. A pointer member is secured to the shaft 22 and comprises a bifurcated portion 24 and a single straight portion 25. A spring member 26 is secured to the shaft 22 on one side of the bifurcated portion 24 of the pointer. This spring member has depending ears 27 extending on each side of the bifurcated portion 24. The ears have apertures through which extends a side balancing arm 28. The normal tendency of the spring ears 27 is to move outwardly, as viewed in Fig. 5 of the drawings, thus decreasing the registering diameters of the apertures with respect to the arm 28. By forcing the ears 27 toward each other the registering diameters of the apertures are enlarged and the arm 28 may then be freely moved through the apertures. The side balancing arms 18 and 28 are preferably screw-threaded, as indicated in the drawings, in order to assure a better and firmer engagement between the spring member and the counter-balancing arm, since the screw-threads offer notches into which the spring member can enter to secure a firm hold.

The moving element shown in Fig. 4 is provided with my novel form of counterweight 30. This counterweight comprises a helical coiled spring whose convolutions lie along an arcual line when the spring is in its normal unrestrained condition, as indicated in Fig. 6 of the drawings. When the spring is placed upon a straight line element, such as the portion 25 of the pointer, its normal resilient tendency causes it to frictionally engage the element. The spring can be easily and conveniently moved along the straight element 25, but will remain in any desired position, due to its normal resilient character and tendency.

It will be observed from the foregoing description that in accordance with the principle of my invention a flat spring holds the counterbalancing arm in position by the inherent tendency of the spring to decrease the registering diameters of the two apertures in the spring. The counterbalancing arm is positioned to extend through the apertures of the spring, and the tendency of the latter is to move the apertures out of the alinement of the counterbalancing arm, whereby the counterbalancing arm and the spring are in effect firmly clasped together. To adjust the counterbalancing arm the normal tendency of the spring is overcome by forcing the apertures into such a position that their registering diameters become appreciably larger than the diameter of the counterbalancing arm whereby the arm may be moved freely through the apertures. In the examples illustrated the apertures may be forced toward each other by a slight pressure applied by the operator's thumb and forefinger to release the clasping engagement of the spring and counterbalancing arm for the adjustment of the latter. Thus my novel and improved construction comprises broadly a flat spring member operatively related to the moving element and to the counterbalancing arm and adapted to firmly secure the latter to the element.

It will of course be understood that the foregoing description and accompanying illustrations are merely for the purpose of explaining the principle of my invention. Numerous practical embodiments of the invention in the moving element of various types of electrical measuring instruments will be evident to those skilled in the art. I, accordingly, do not wish to be restricted to the particular constructions disclosed herein by way of example for the purpose of setting forth my invention in accordance with the patent statutes. The terms of the appended claims are, therefore, not restricted to the precise structures disclosed but are intended to cover all changes and modifications within the spirit and scope of my invention.

What I claim as new and desire to secure by Letters Patent of the United States, is:—

1. In an electrical measuring instrument the combination with a movable member of a counterbalancing arm, and a spring member operatively related to said movable member and having apertures through which said arm extends.

2. In an electrical measuring instrument, the combination with a movable member of a counterbalancing arm, and means for securing said arm to said movable member comprising a spring member having apertures through which said arm extends, the registering diameters of said apertures being adapted to be altered by varying the relative positions of the apertures.

3. In an electrical measuring instrument, the combination with a movable member of a counterbalancing arm, and means for securing said arm to said movable member comprising a spring member having apertures through which said arm extends, the normal resilient character of said spring member being such that said arm is securely held in said apertures.

4. In an electrical measuring instrument, the combination with a movable member of a counterbalancing arm, and means for securing said arm to said movable member comprising a spring member having apertures of a greater diameter than that of said arm through which said arm extends, said arm being firmly held in said apertures by the normal resilient character of said spring member but being adapted to be moved freely through said apertures when the relative position of the apertures is varied to increase the effective registering diameters of said apertures with respect to said arm.

5. In an electrical measuring instrument, the combination with a movable member of a counterbalancing arm, and means for securing said arm to said movable member comprising a spring member mounted on said movable member and having extending ears with apertures therein through which said arm extends, the registering diameters of said apertures being adapted to be altered by varying the relative positions of the apertures.

6. In an electrical measuring instrument, the combination with a movable shaft of a counterbalance comprising a helical coiled spring mounted on an element operatively connected to and extending from said shaft.

7. In an electrical measuring instrument, the combination with a movable shaft of a counterbalance comprising a helical coiled spring whose convolutions normally lie along an arcual axis, said spring being mounted on a straight element operatively related to said shaft.

8. In an electrical measuring instrument, the combination with a movable member of a counterbalancing arm, and a spring element bearing against said member and exerting a force on said arm to hold said arm in an adjusted position with respect to said member.

9. In an electrical measuring instrument, the combination with a movable member having a transverse hole therein of a counterbalancing arm extending through said hole, and a flat spring member operatively related to said movable member and to said counterbalancing arm and adapted to firmly secure said counterbalancing arm in a relatively fixed position with respect to said movable member.

10. In an electrical measuring instrument, the combination with a moving element of a counterbalancing arm, and a flat spring member operatively related to said moving element and to said counterbalancing arm and adapted to firmly secure said counterbalancing arm to said moving element.

In witness whereof, I have hereunto set my hand this 28th day of September 1914.

ALVARADO L. R. ELLIS.

Witnesses:
JOHN A. MCMANUS, Jr.,
ROBERT SHAND.